United States Patent
Dietrich et al.

(10) Patent No.: US 9,335,102 B2
(45) Date of Patent: May 10, 2016

(54) PLATE HEAT EXCHANGER WITH SEVERAL MODULES CONNECTED BY SHEET-METAL STRIPS

(71) Applicant: LINDE AKTIENGESELLSCHAFT, Munich (DE)

(72) Inventors: Jorg Dietrich, Erding (DE); Reinhold Holzl, Geretsried (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 367 days.

(21) Appl. No.: 13/852,033

(22) Filed: Mar. 28, 2013

(65) Prior Publication Data

US 2013/0255924 A1    Oct. 3, 2013

(30) Foreign Application Priority Data

Mar. 29, 2012  (DE) .......................... 10 2012 006 483

(51) Int. Cl.
| | |
|---|---|
| *F28F 3/08* | (2006.01) |
| *F28F 9/26* | (2006.01) |
| *F28D 9/00* | (2006.01) |
| *B23P 15/26* | (2006.01) |
| *F25J 5/00* | (2006.01) |

(52) U.S. Cl.
CPC .................. *F28F 3/086* (2013.01); *B23P 15/26* (2013.01); *F25J 5/002* (2013.01); *F28D 9/0062* (2013.01); *F28D 9/0068* (2013.01); *F28F 3/08* (2013.01); *F28F 9/26* (2013.01); *F25J 2290/32* (2013.01); *F25J 2290/42* (2013.01); *F25J 2290/50* (2013.01); *F28F 2275/025* (2013.01); *Y10T 29/49366* (2015.01)

(58) Field of Classification Search
CPC .............. F28F 3/08; F28F 9/26; F28D 9/0062
USPC .......................................... 165/144, 145, 166
See application file for complete search history.

(56) References Cited

U.S. PATENT DOCUMENTS

| | | | | |
|---|---|---|---|---|
| 2,875,986 | A | * | 3/1959 | Holm ............................. 165/145 |
| 3,372,453 | A | * | 3/1968 | Butt .............................. 165/166 |
| 3,633,661 | A | * | 1/1972 | Duncan et al. ................ 165/166 |

(Continued)

FOREIGN PATENT DOCUMENTS

| | | |
|---|---|---|
| DE | 102009033661 A1 | 1/2011 |
| EP | 1087194 A1 | 3/2001 |

(Continued)

OTHER PUBLICATIONS

European Search Report from corresponding European Application No. EP12004194 dated Nov. 30, 2012.
English Translation Abstract for DE102009033661A1 dated Jan. 20, 2011.

(Continued)

*Primary Examiner* — Leonard R Leo
(74) *Attorney, Agent, or Firm* — Millen, White, Zelano, Branigan, P.C.

(57) ABSTRACT

The invention describes a plate heat exchanger 1 comprising two modules 1a and 1b. The two modules 1a and 1b are cuboidal and in each case are closed off to the outside by cover sheets 5. The two modules 1a and 1b are arranged such that cover sheets 9a and 9b of the same size are directly adjacent. The two cover sheets 9a and 9b form the contact surface between the two modules 1a and 1b of the plate heat exchanger 1. The two contact surfaces 9a and 9b are joined to one another via a suitable adhesive.

7 Claims, 5 Drawing Sheets

(56) References Cited

U.S. PATENT DOCUMENTS

| | | | |
|---|---|---|---|
| 4,297,775 A * | 11/1981 | Butt et al. | 165/166 |
| 4,926,935 A * | 5/1990 | Haushalter | 165/185 |
| 5,144,809 A | 9/1992 | Chevalier et al. | |
| 6,374,636 B1 | 4/2002 | Thonnelier et al. | |
| 2012/0199335 A1* | 8/2012 | Maurer | 165/185 |
| 2013/0087314 A1* | 4/2013 | Jaouani et al. | 165/144 |

FOREIGN PATENT DOCUMENTS

| | | |
|---|---|---|
| EP | 1329680 A1 | 7/2003 |
| FR | 2665755 A1 | 2/1992 |

OTHER PUBLICATIONS

English Translation Abstract for FR2665755A1 dated Feb. 14, 1992.
English Translation Abstract for EP1087194A1 dated Mar. 28, 2001.
English Translation Abstract for EP1329680A1 dated Jul. 23, 2003.
R. Poggiani "Materials and components of possible interest for cryogenic operation of Einstein Telescope" University of Pisa and INFN Pisa, ET-026-09, Issue 1, Oct. 29, 2009, 42 pages.
Vishay Precision Group, www.micro-measurements.com, Document No. 10390, Apr. 26, 2010, pp. 18-19.
"The Standards of the Brazed Aluminium Plate-Fin Heat Exchanger Manufacturers' Association" ALPEMA, Second Edition [2000], 71 pages.

* cited by examiner

PLATE HEAT EXCHANGER WITH SEVERAL MODULES CONNECTED BY SHEET-METAL STRIPS

SUMMARY OF THE INVENTION

The invention relates to a plate heater exchanger comprising the following:
at least two modules, each module having a plurality of stacked passages through which the heat-exchanging media can flow in alternation and which are separated from one another by partitions,
the modules being altogether cuboidal and being bordered on the outsides by cover sheets,
the modules being arranged next to one another such that one rectangular side of one cuboidal module is directly adjacent to a corresponding rectangular side of another cuboidal module,
the modules having means for supply and discharge of the heat-exchanging media as well as means (headers) for distribution and collection of the heat-exchanging media among the individual passages or from the individual passages, and
whereby there are at least two modules having at least one common header.

The invention further relates to a method for the production of such a plate heater exchanger.

Brazed plate heat exchangers made of aluminum are used in numerous systems at the most varied pressures and temperatures. They are used, for example, in the separation of air, the liquefaction of natural gas, or in plants for producing ethylene.

Such a plate heat exchanger is described in, for example, "The Standards of the Brazed Aluminum Plate-Fin Heat Exchanger Manufacturer's Association," ALPEMA report (2000). A figure taken from this report is shown as FIG. 1 as state of the art and is described below.

Figure 1:
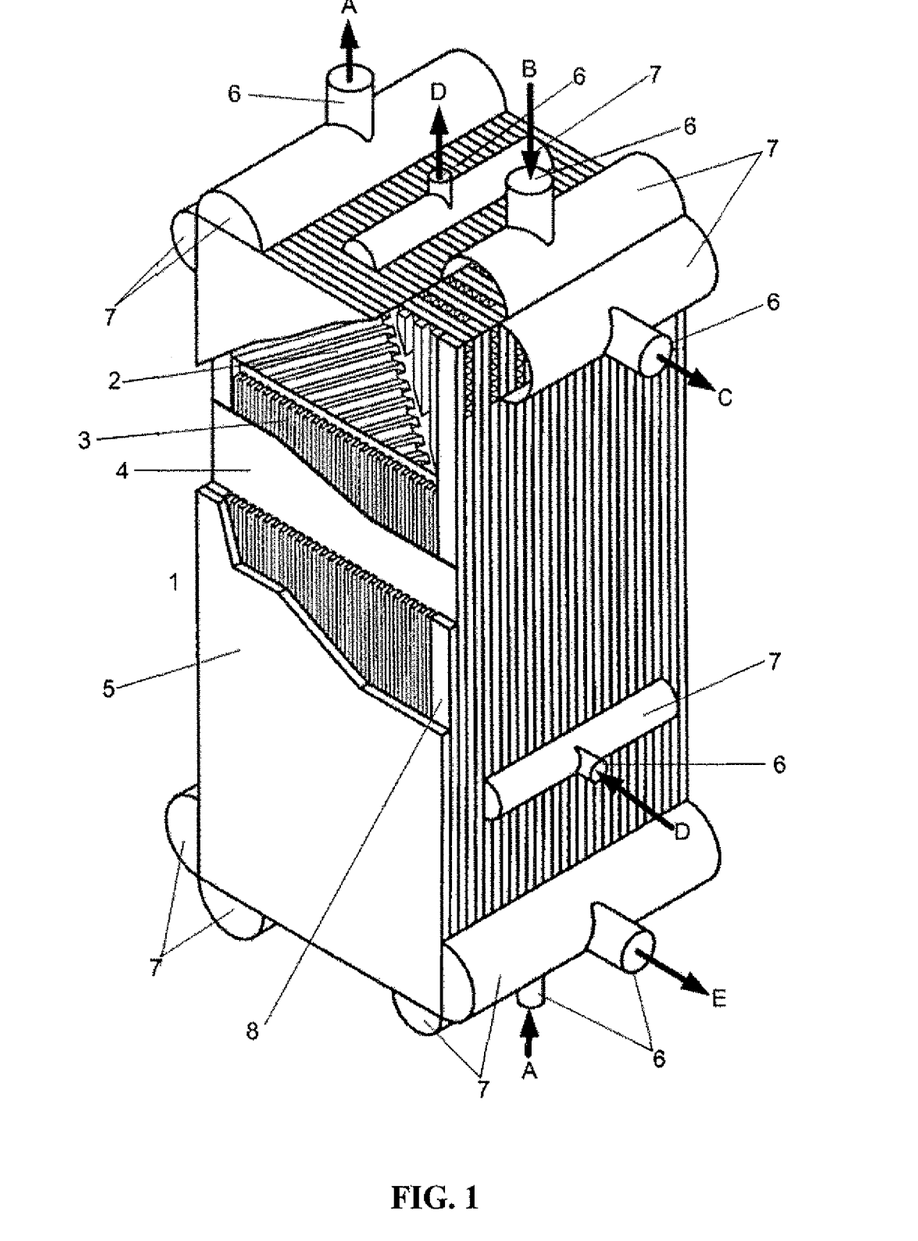
FIG. 1 shows an embodiment of a prior art plate heat exchanger.

The plate heat exchanger 1 shown in FIG. 1 uses five different process streams A, B, C, D and E for heat exchange. The heat exchanger 1 is block-shaped and is equipped with the various means 6 for supply and discharge of the individual process media. These means 6 are called fittings below (inlets and outlets) and are within the scope of this application. The heat exchanger likewise has several means 7 for distributing and collecting the individual process streams A, B, C, D and E, which are called headers below and are within the scope of this application.

The plate heat exchanger 1 essentially comprises a plurality of stacked passages 3 that are separated from one another by partitions 4. The various media flow into the individual passages 3 (see, for example, pages 8-9 of ALPEMA report (2000)). The heat exchange takes place indirectly via thermal contact that is produced by the partitions 4 and by the wavy structures that form the passages 3 (these wavy structures are called heat exchange fins below and within the scope of this application). The individual media A, B, C, D and E are routed into the headers 7 via the fittings 6 and in this way are distributed among the stacked passages 3 that are provided in each case. In the inlet region of the passages, there are so-called distributor fins 2 that provide for a uniform distribution of the medium to the individual passages 3. With regards to these distributor fins 2, see, for example, the ALPEMA report (2000) at pages 9-11. The media thus flow transversely to the wave direction of the heat exchange fins that forms the passages 3. The heat exchange fins are connected to the partitions 4, as a result of which intensive thermal conduction contact is produced. In this way, heat exchange can take place between two different media that flow into adjacent passages 3. Viewed in the direction of flow, on the end of the passage there are similar distributor fins 2 that route the media out of the passages 3 into the headers 7 where they are collected and drained off via the fittings 6. The individual passages 3 are closed to the outside by so-called sidebars 8. The entire heat exchanger block is bordered to the outside by cover sheets 5.

These plate heat exchangers are outstandingly well suited for heat exchange of at least 2 media. However, as shown in FIG. 1, even more than 2 media can participate in heat exchange through suitable design. This allows very effective process management and effective use of heat and cold.

These plate heat exchangers are brazed from, for example, aluminum. The individual passages with the fins, distributor fins, cover sheets and sidebars are stacked on one another, provided with solder, and brazed in a furnace. Then, headers and fittings are welded onto the resulting block.

Brazing differs from welding in that welding typically requires higher temperatures since in welding the filler material and the metals to be joined are all heated to their melting temperatures. Thus, welding causes the filler material to penetrate into the joining metals, thereby mixing the metals. In brazing, the metals to be joined do not get heated to their melting temperatures. Only the filler material is heated its melting temperature. Thus, in brazing the filler material does not penetrate into the base metals. Brazing is similar to soldering, although brazing uses filler materials having higher melting points than that of typical soldering filler materials. Also, during welding the filler and the joining metals are melted together, making one piece. In brazing the filler is melted into the joint between the joining pieces. During brazing the filler spreads along the joint filling it in. In welding two the filler material melts in place, causing the filler to ripple, and remains in place once it melts, because the filler and the metal join together as one.

The maximum size of such a plate heat exchanger block is also dictated by the just-described production method by the size and geometry of the brazing furnace. Often, however, the process requirements necessitate a larger heat exchange surface and thus larger heat exchanger blocks. In these cases, in order to meet these requirements, plate heat exchangers according to the state of the art consist of at least two modules. Within the scope of this application, one module is defined as a heat exchanger block that is produced in a brazing furnace as described initially. Several such modules are connected to one another according to the state of the art and are equipped with common headers for distribution and collection of the media that participate in the heat exchange. In this case, the connection between two different modules of a plate heat exchanger takes place according to the state of the art by way of sidebars.

The plate heat exchanger that is shown in FIG. 1 according to the state of the art consists of one module. In order to produce a plate heat exchanger with several modules, a heat exchanger block, as shown in FIG. 1, i.e., without headers and fittings, is welded onto a second such heat exchanger block. Along the edges of the cover sheet, sidebars are welded on the cover sheet 5. The second module that is to be joined to the first module is arranged such that the two directly adjacent sides of the two modules have the same shaped cover sheets. The surface that is formed by one cover sheet that is directly adjacent to another module is called the contact surface below. For purposes of connection, the cover sheet is welded to the sidebars on the cover sheet of the directly adjacent module. Therefore, according to the state of the art, the sidebars form more or less a frame on the cover sheet. This frame is welded to the cover sheet of the adjacent module and in this way a connection is produced between two modules. The two connected modules thus form a new heat exchanger block that is larger than the actual geometry of the brazing furnace. In this way, any number of modules can be joined to one another to form a heat exchanger block of any size. Here, two adjacent modules have at least one common header.

Between two modules of such a plate heat exchanger, thus between the two connected cover sheets, a layer of air forms that in this way forms more or less a passage that does not carry pressure, which does not participate in heat exchange, and through which flow has not taken place (a "blind" passage). Accordingly, the thermal contact between two modules is much worse than the thermal contact within an individual module. This leads to thermal stresses within plate heat exchangers having at least two modules in various applications.

Thus, one aspect of the invention is to configure a plate heat exchanger with at least two modules, as described above, such that a connection is produced between two directly adjacent modules that is as strong and rigid as possible. Forces, for example resulting from thermal stresses between two modules, will be minimized, and the mechanical strength of the entire block that contains at least two modules will be increased.

Another aspect of the invention is to provide a method for manufacturing such a plate heat exchanger.

Upon further study of the specification and appended claims, other aspects and advantages of the invention will become apparent.

These aspects are achieved by a plate heat exchanger comprising at least two modules wherein each module has a plurality of stacked passages through which the heat-exchanging media can flow in alternation and which are separated from one another by partitions. The modules are altogether cuboidal and bordered on the outsides by cover sheets. The modules are further arranged next to one another such that one rectangular side of one cuboidal module is directly adjacent to a corresponding rectangular side of another cuboidal module. The modules have means for supply and discharge of the heat-exchanging media, and means (headers) for distribution and collection of the heat-exchanging media among the individual passages or from the individual passages. Further, at least two modules have a common header. In addition, two cover sheets that each form directly adjacent sides of two adjacent modules, called contact surfaces below, are joined to one another via a suitable adhesive. Suitable adhesives include adhesives described in "Materials and components of possible interest for cryogenic operation of Einstein Telescope: ET-026-09," R. Poggiani, Issue: 1, Date: 29 Oct. 2009 (University of Pisa and INFN Pisa) such as those from Loctite, and M-Bond series adhesives form Vishay Precision Group.

On the method side, these aspects are achieved by a method wherein the cover sheet of at least one module is joined with a suitable adhesive to the cover sheet of another module.

According to the invention, the two cover sheets that form the respectively directly adjacent sides of two adjacent modules, called contact surfaces below, are joined to one another via a suitable adhesive. The joining of the contact surfaces according to the invention via a suitable adhesive ensures a much flatter connection than in the state of the art. For a plate heat exchanger according to the state of the art, the contact surfaces of two adjacent modules are joined to one another only on the respective edges of the surface via sidebars. The contact surfaces of a plate heat exchanger according to the state of the art do not have any connections in the center of the contact surfaces. This disadvantage of the state of the art is avoided by the plate heat exchanger according to the invention, in which the contact surfaces are joined via a suitable adhesive. In addition, the plate heat exchanger according to the invention thus does not have any blind passages through which flow does not take place between two adjacent modules. This distinctly improves the thermal contact between adjacent modules. In this way, thermal stresses are minimized, and the durability of the plate heat exchanger according to the invention is increased. The two contact surfaces are cemented to one another according to the invention.

According to one preferred configuration of the invention, the contact surfaces are joined to one another such that a mechanical and heat-conductive connection between two adjacent modules is formed, whereby at least one sheet-metal strip is joined via adhesive to the cover sheet of one module and via adhesive to the cover sheet of an adjacent module. In this preferred configuration, the two contact surfaces of the adjacent modules of a plate heat exchanger according to the invention are joined to one another via adhesive and at least one sheet-metal strip. The cover sheets that close off a module are rarely completely even, due to the brazing process and the associated nonuniform distribution and hardening of the brazing material. When the cover sheets of adjacent modules are joined, this causes differences in height. The height differences between the contact surfaces of two adjacent modules can be equalized in this configuration of the invention by at least one sheet-metal strip being joined by way of adhesive to the cover sheet of one module and to the cover sheet of the adjacent module. In this case, the narrow sheet-metal strips used are employed not only for equalizing the height differences. In addition, they improve the heat conduction contact between two directly adjacent modules. In this configuration of the invention, a mechanically especially stable and heat-conductive connection between the directly adjacent modules is achieved in this way.

In one alternative configuration of the invention, the contact surfaces are joined to one another such that a mechanical and heat-conductive connection between two adjacent modules is formed, whereby at least one sheet-metal strip is joined via adhesive to the cover sheet of one module and via at least one sheet-metal strip that is or that are joined to the cover sheet of the adjacent module via adhesive. In this alternative configuration of the invention, the contact surfaces of two directly adjacent modules are provided individually with sheet-metal strips. In this case, the sheet-metal strips are cemented onto the cover sheets via a suitable adhesive. The connection between the contact surfaces of two adjacent modules takes place in this configuration in that the sheet-metal strips that are joined to the cover sheets with adhesive are joined to the sheet-metal strips of the adjacent module. In this configuration of the invention, in particular several sheet-metal strips are used, whereby the sheet-metal strips are arranged such that the sheet-metal strips on one contact surface are angled toward the sheet-metal strips of the directly adjacent contact surface. The sheet-metal strips can be arranged, for example, at right angles to one another. Here, much better thermal contact between adjacent modules than in the state of the art is also achieved via the plurality of sheet-metal strips. In the prior art, the sidebars are welded along the outer rim (of the cover sheets) of the two connecting modules. The surfaces of the cover sheets in the inner region are not welded to each other. So when using only sidebars a mechanical and thermal connection is provided only at the sidebars. There is no face to face contact of the cover sheets. In accordance with the invention, at least a part of the surface area of the adjacent cover sheets can be mechanically and thermally connected by the adhesive and/or the metal stripes.

Especially preferably, one contact surface has several, preferably a plurality of, regularly arranged sheet-metal strips. A plurality of regularly arranged sheet-metal strips further improves the thermal contact by the thermal conductivity of the sheet-metal strips between adjacent modules.

In one preferred configuration, a plurality of sheet-metal strips is arranged regularly on at least one contact surface such that the entire contact surface is filled by sheet-metal strips free of gaps. This configuration is especially suited for plate heat exchangers whose arrangement requires especially intensive thermal contact between the contact surfaces of adjacent modules. This is the case, for example, for steep temperature gradients, major changes in the temperature gradient or for nonuniform distributions of the media participating in the heat exchange (maldistribution). These states can often occur in certain vaporization processes of two-phase mixtures or pure substances, in an asymmetrical passage arrangement, unspecified operating states, shutdown processes or start-up processes.

In another preferred configuration of the invention, a plurality of sheet-metal strips are arranged regularly and spaced apart from one another on at least one contact surface such that the sheet-metal strips are uniformly distributed over the entire contact surface, whereby the distance between two adjacent sheet-metal strips is smaller than or equal to the greater width of the respectively adjacent sheet-metal strips (the metal strips may vary in their width from one strip to another strip; the greater width being the width of the wider of two adjacent strips). In this configuration of the invention, a similarly good heat conduction contact is achieved as in the configuration in which the entire contact surface is filled by sheet-metal strips free of gaps. Here, however, a much smaller number of sheet-metal strips is required.

Advantageously, all sheet-metal strips of one contact surface have the same width. This facilitates purchase, engineering and production of the plate heat exchanger according to the invention.

It is likewise useful that the length of the sheet-metal strip/ strips of one contact surface corresponds to one side length of the contact surface. In this case, the thickness of the sheet-metal strips can advantageously vary for different contact surfaces and/or one contact surface. Thus, varied height differences and unevenness of a cover sheet or a contact surface can be optimally equalized.

Advantageously, the passages of the modules are filled with a wavy structure (fins) (see, for example, pages 8-9 of ALPEMA report (2000)) such that the heat-exchanging media can flow transversely to the direction of the undulation through the passages. This improves the heat exchange between two media in adjacent passages.

Advantageously, the adhesive is chosen depending on the operating temperature and/or operating pressure of the plate heat exchanger.

In a plate heat exchanger according to the invention, the mechanical and thermal connection between two adjacent modules is distinctly improved compared to the state of the art. The entire plate heat exchanger block containing several modules is a distinctly more rigid and mechanically more stable configuration than a plate heat exchanger block of several modules according to the state of the art. In addition, a plate heat exchanger according to the invention has much better temperature equalization between two adjacent modules.

BRIEF DESCRIPTION OF THE DRAWINGS

Further advantages, features and details of the present invention shall be described in the following with reference to the Figures, wherein.

Figure 2:
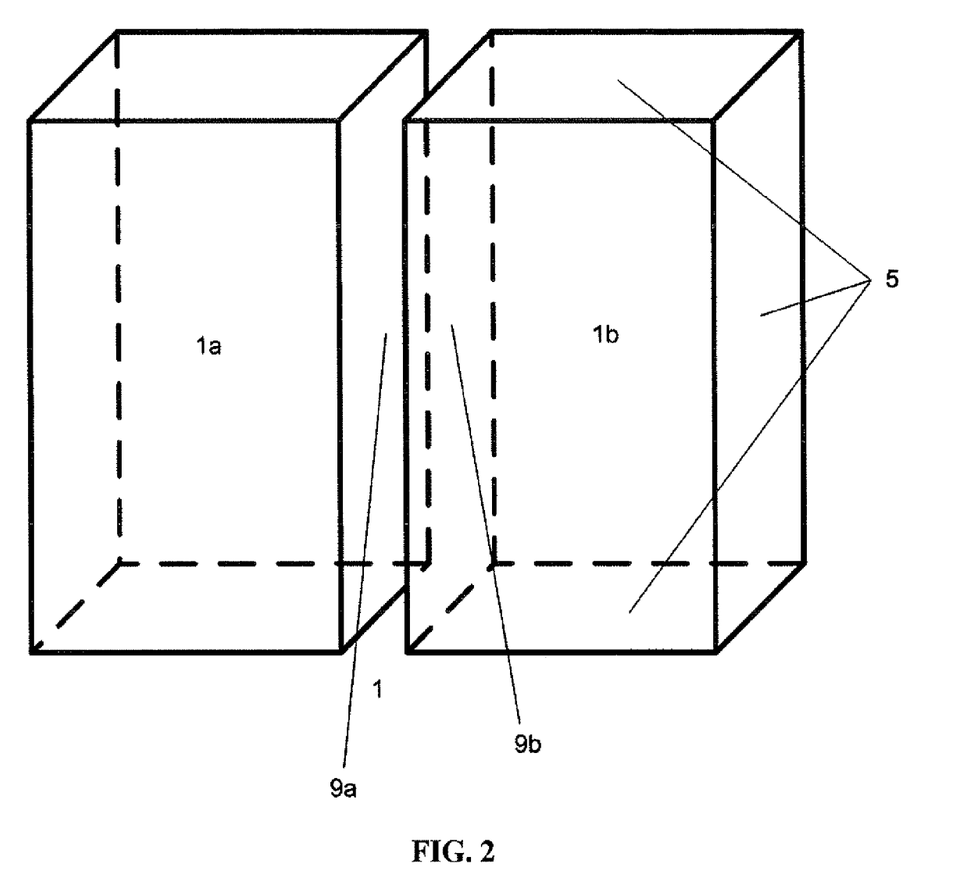
FIG. 2 shows an exemplary embodiment of a plate heat exchanger according to the invention.

The prior art embodiment of FIG. 1 is discussed above. The configuration of a plate heat exchanger 1 according to the invention that is shown in FIG. 2 comprises two modules 1a and 1b. The two modules 1a and 1b are cuboidal and are closed to the outside in each case by cover sheets 5. Both modules 1a and 1b are arranged such that cover sheets 9a and 9b of the same size are directly adjacent. The two cover sheets 9a and 9b form the contact surface between the two modules 1a and 1b of the plate heat exchanger 1. The two contact surfaces 9a and 9b are joined to one another via a suitable adhesive.

Figure 3:
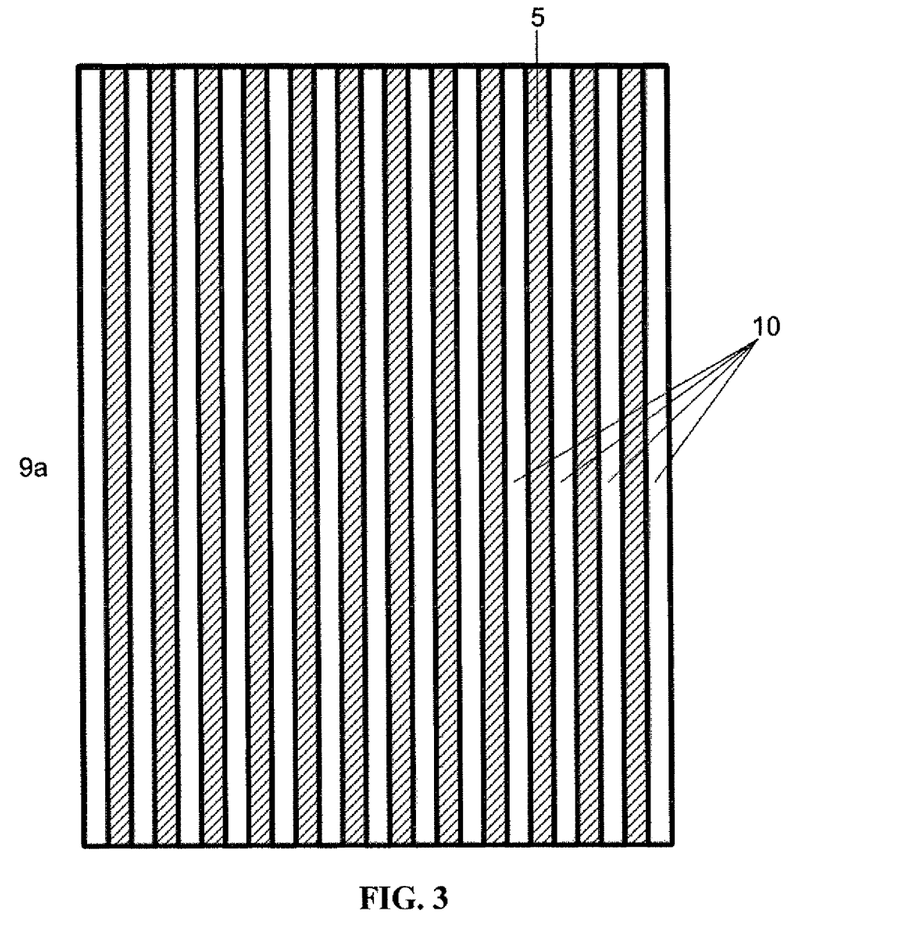
FIG. 3 shows another exemplary embodiment of a plate heat exchanger according to the invention.
Figure 4:
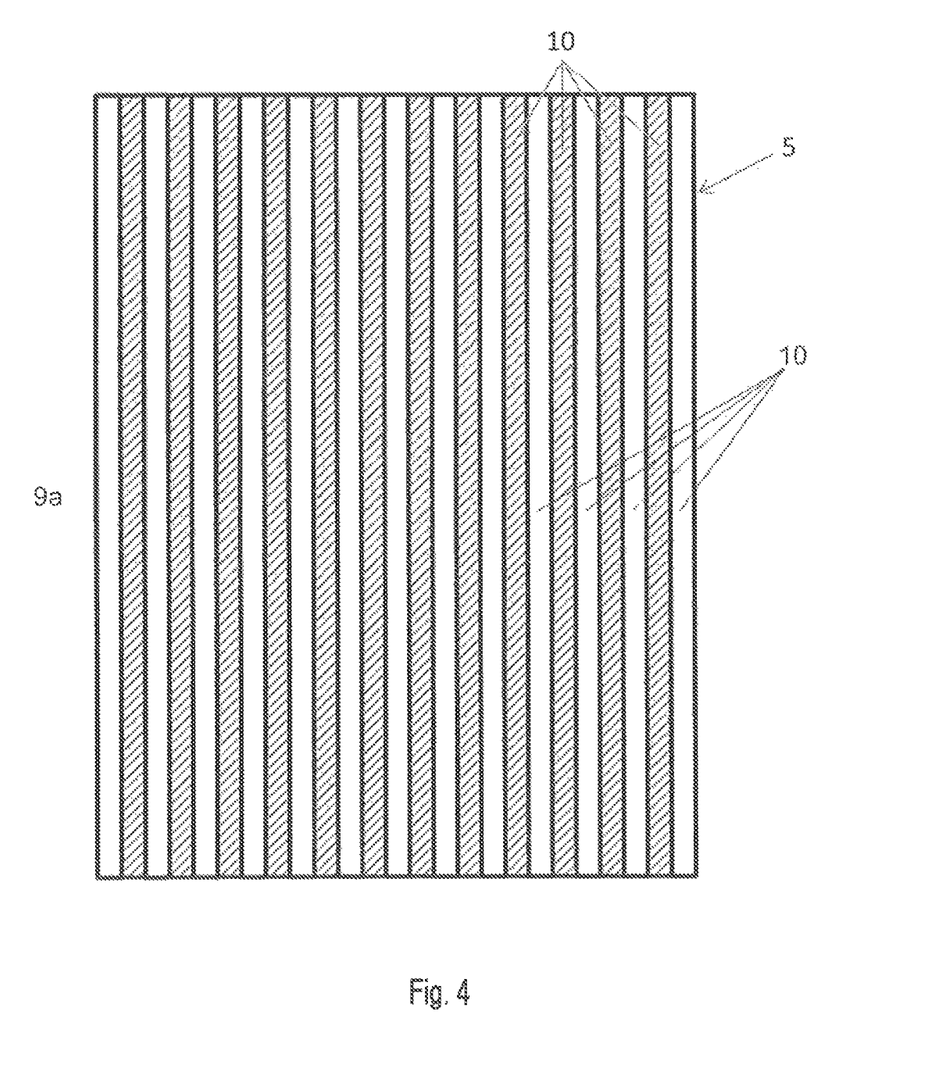
FIG. 4 shows another exemplary embodiment of a plate heat exchanger according to the invention in which the entire surface of a contact surface is covered by sheet-metal strips.
Figure 5:
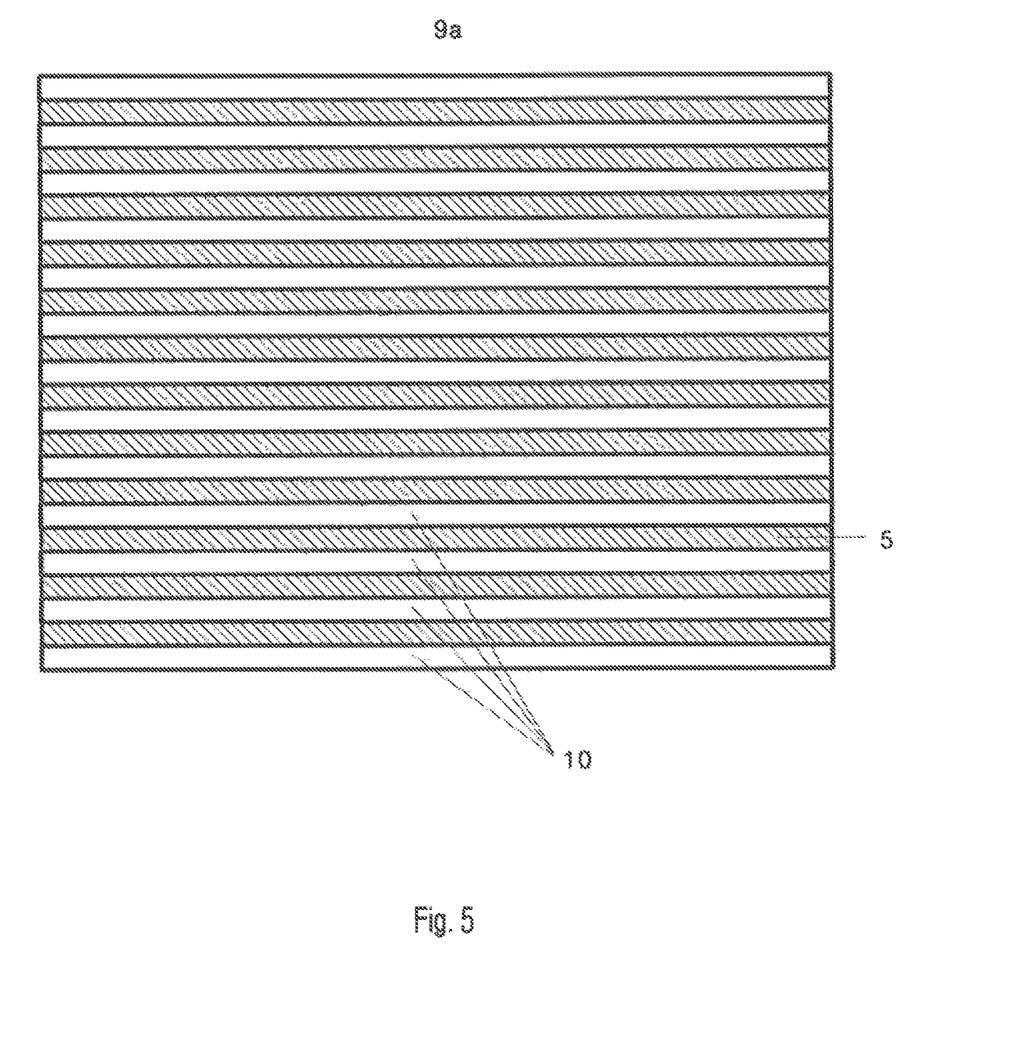
FIG. 5 shows another exemplary embodiment of a plate heat exchanger according to the invention in which the sheet-metal strips on a contact surface are angled with respect to the sheet-metal strips on the contact surface illustrated in FIG. 3.

This is shown in detail in FIG. 3. FIG. 3 shows the contact surface 9a. The cover sheet 5 (shown cross-hatched) is provided with adhesive. A plurality of sheet-metal strips 10 are joined to the contact surface 9a via the adhesive. The sheet-metal strips 10 have a length that agrees with the edge length of the cover sheet 9a. The sheet-metal strips 10 are regularly arranged on the cover sheet 9a such that the gap between two sheet-metal strips 10 corresponds to the width of the sheet-metal strip 10 itself. To equalize differences in height, the individual sheet-metal strips can each have a different thickness. FIG. 4 shows an embodiment wherein the entire surface of contact surface 9a is covered by sheet-metal strips. FIG. 5 shows sheet-metal strips on a contact surface that are angled with respect to the sheet-metal strips on the contact surface illustrated in FIG. 3.

The contact surface 9a that is provided with sheet-metal strips in this way is joined to the contact surface 9b of the module 1b via the same adhesive. The two modules 1a and 1b are thus joined nonpositively to one another mechanically and in a thermally conductive manner and form the entire heat exchanger block of the plate heat exchanger 1.

This entire block is then provided with fittings and headers for supply and discharge, and for distribution and collection of the media participating in the heat exchange. In this case, the two modules 1a and 1b have at least one common header (not shown).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application No. 10 2012 006483.7, filed Mar. 29, 2012, are incorporated by reference herein.

The invention claimed is:

1. A plate heat exchanger (1) comprising:
at least two modules (1*a*, 1*b*), wherein each module (1*a*, 1*b*) has a plurality of stacked passages (3) through which heat-exchanging media can flow in alternation and which are separated from one another by partitions (4),
said modules (1*a*, 1*b*) are each of cuboidal shape and are bordered on the outsides by cover sheets (5),
said modules (1*a*, 1*b*) are arranged next to one another such that one rectangular side (9*a*) of one cuboidal module (1*a*) of said at least two modules is directly adjacent to a corresponding rectangular side (9*b*) of another cuboidal module (1*b*) of said at least two modules,
each of modules having fittings (6) for supplying and discharging heat-exchanging media (A, B, C, D, E) and headers (7) for distributing and collecting heat-exchanging media (A, B, C, D, E) to the individual passages (3) or from the individual passages (3), and wherein at least two modules (1*a*, 1*b*) have a common (7) header, and
each of two cover sheets (5) that each form directly adjacent sides (9*a*, 9*b*) of two adjacent modules (1*a*, 1*b*) form a contact surface (9*a*, 9*b*) and these contact surfaces (9*a*, 9*b*) are joined to one another, so that a mechanical and heat-conductive connection is formed between the two adjacent modules (1*a*, 1*b*), via a plurality of separate and individual sheet-metal strips (10), each of said sheet-metal strips having two opposing faces wherein one of said opposing faces is joined via adhesive to the cover sheet (5) of one of said two adjacent modules (1*a*, 1*b*) and the other of said opposing faces is joined via adhesive to the cover sheet (5) of the other of said two adjacent modules (1*a*, 1*b*), and wherein said plurality of said sheet-metal strips (10) is arranged regularly on at least one of said contact surfaces (9*a*, 9*b*) such that the entire surface (9*a*, 9*b*) of said at least one of said contact surfaces (9*a*, 9*b*) is covered by said sheet-metal strips (10) free of gaps.

2. The plate heat exchanger according to claim 1, wherein all of said sheet-metal strips (10) joined both of said contact surfaces (9*a*, 9*b*) have the same width.

3. The plate heat exchanger according to claim 1, wherein the length of said at least one sheet-metal strips (10), joined to said contact surfaces (9*a*, 9*b*), corresponds to one side length of one of said two cover sheets (5).

4. The plate heat exchanger according to claim 3, wherein all of said sheet-metal strips (10) joined to one of said contact surfaces (9*a*, 9*b*) have the same width.

5. The plate heat exchanger according to claim 1, wherein the passages of the modules are filled with fins such that the heat-exchanging media can flow transversely to the direction of the undulation through the passages.

6. The plate heat exchanger according to claim 5, wherein the length of said at least one sheet-metal strips (10), joined to one of said contact surfaces (9*a*, 9*b*), corresponds to one side length of one of said two cover sheets (5).

7. A method for producing a plate heat exchanger (1) according to of claim 1, comprising joining the cover sheet (5) of at least one module (1*a*, 1*b*) to the cover sheet (5) of another module (1*a*, 1*b*) to one another so that a mechanical and heat-conductive connection is formed between the two adjacent modules (1*a*, 1*b*), wherein said plurality of sheet-metal strips (10) are joined via adhesive to the cover sheet (5) of one of said two adjacent modules (1*a*, 1*b*) and via adhesive to the cover sheet (5) of the other of said two adjacent modules (1*a*, 1*b*), and wherein said plurality of said sheet-metal strips (10) is arranged regularly on at least one of said contact surfaces (9*a*, 9*b*) such that the entire surface (9*a*, 9*b*) of said at least one of said contact surfaces (9*a*, 9*b*) is covered by said sheet-metal strips (10) free of gaps.

* * * * *